Patented Sept. 8, 1953

2,651,635

UNITED STATES PATENT OFFICE 2,651,635

PREPARATION OF 1-BENZYL-1:2:3:4:5:6:7:8-OCTAHYDRO-ISOQUINOLINE

Hans Henecka, Wuppertal-Elberfeld, Germany, assignor, by mesne assignments, to Farbenfabriken Bayer Aktiengesellschaft, Leverkusen-Bayerwerk, Germany No Drawing. Application December 9, 1950, Serial No. 200,123. In Switzerland December 16, 1949

3 Claims. (Cl. 260—283)

This invention relates generally to therapeutic agents useful as analgesics, together with processes for making such agents. More particularly, the invention relates to analgesic agents which are closely related, both in chemical constitution and therapeutic activity, to the opium alkaloid, morphine.

It has been found that a chemical compound designated N-methylmorphinane by Grewe et al., Ber. 81, 279–86 (1948) and closely related to morphine in chemical structure, produces analgesic effects and has other therapeutically useful properties almost as powerful as morphine itself.

Various procedures for the synthesis of this compound have been proposed, as outlined in the report of the investigations by Grewe et al. above cited, and in further reports by the same workers, but, in general these methods have had the common disadvantage of requiring organo-metallic compounds as intermediates that could be obtained only with difficulty and by complicated routes of organic synthesis, thus precluding use of these methods in commercial or large scale operation.

For example, it has been suggested to react benzyl magnesium chloride with N-methyl-5,6,7,8-tetrahydroisoquinolinium iodide, which may be prepared by treating 5,6,7,8-tetrahydroisoquinoline with methyl iodide, to produce 2 - methyl - 1 - benzyl - 1,2,5,6,7,8 - hexahydro - isoquinoline, which may be converted to 2-methyl - 1 - benzyl - 1,2,3,4,5,6,7,8 - octahydroiso - quinoline by catalytic hydrogenation, then causing this compound to undergo intramolecular rearrangement and cyclization by heating it with about ten times its weight of syrupy orthophosphoric acid at 150° C. for a period of three days, to yield the desired N-methyl-morphinane. Another suggested process involves reaction of benzaldehyde with 1-lithium-5,6,7,8-tetrahydroisoquinoline to produce the corresponding carbinol, reducing this carbinol to 1-benzyl-5,6,7,8-tetrahydro-isoquinoline, treating it with methyl iodide to form the corresponding quaternary salt and thereafter reducing this salt and then, by the intramolecular rearrangement and cylization above mentioned, obtaining the desired N-methyl-morphinane.

One of the chief objects of the present invention is to provide a process for the synthesis of compounds that may be utilized as intermediates in making N-methyl-morphinane and kindred substances, having the advantage over previously known methods of not requiring expensive or difficultly prepared raw materials or other intermediates.

It is also an object of this invention to provide a method for synthesis of compounds of the type mentioned which will readily permit preparation of closely related alkoxy, especially methoxy, substituted compounds by the mere selection of a suitably substituted initial reactant.

Regarded in certain of its broader aspects, the novel process of this invention may be represented as follows:

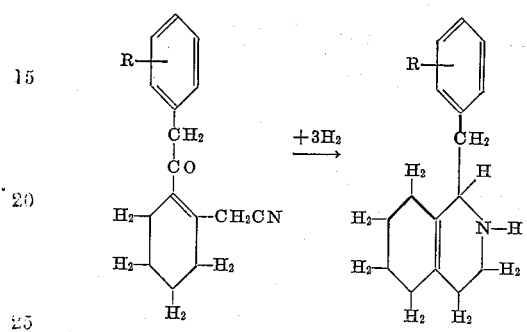

wherein R is at least one substituent chosen from the group consisting of hydrogen and alkoxy.

The starting material used in this process may be produced by condensation of phenylacetyl chloride with cyclohexenylacetonitrile in the presence of aluminum chloride, using a suitable organic solvent medium and cooling the mixture while effecting the condensation, as described in this inventor's concurrently filed application, Serial No. 200,122.

Stated in more specific terms, the process of this invention involves the addition of three moles of hydrogen per molecule to $\Delta^{1,2}$-2($\alpha$-toluyl)-cyclohexenyl-acetonitrile, by treatment with hydrogen under super-atmospheric pressures in the presence of Raney nickel or an equivalent hydrogenation catalyst, to produce, as the reduction product, 1 - benzyl - 1,2,3,4,5,6,7,8 - octahydroisoquinoline.

To illustrate an application of the principles of this invention, a typical process will now be described as an example, with the understanding that, by use of suitable alkoxy substituted initial reactants, compounds useful in the synthesis of alkoxy substituted N-methyl-morphinanes may be obtained.

Example

About 80.4 grams of $\Delta^{1,2}$-2($\alpha$-toluyl)cyclohexenyl-acetonitrile are dissolved in 300 cc. of methanol and hydrogenated at 80–100° C. by direct reaction with gaseous hydrogen at a pressure of about 60 atmospheres in the presence of approximately 10 grams of Raney-nickel. The absorption of hydrogen corresponds almost exactly to three moles of hydrogen per mole of starting material and is completed after about one hour. After cooling the mixture, the catalyst is separated, the methanol is evaporated in vacuo at 40° C., the residue is taken up with dilute mineral acid, a small amount of neutral by product is extracted with ether, the base is liberated from its acid solution by addition of potassium-carbonate solution, then the mixture is shaken with ether, the ethereal solution is distilled and the residue is recovered. The 1-benzyl-1,2,3,4,5,6,7,8-octahydroisoquinoline thus obtained distils as a water-clear oil at 40° at 0.7 mm. pressure. The yield amounts to 60.4 grams, corresponding to 79-80 percent of the theoretical.

The picrate of this reaction product is obtained as light-yellow crystals, melting at 155–157° C. after recrystallization from methanol.

Having thus described the subject matter of this invention, what it is desired to secure by Letters Patent is:

1. Process for the synthesis of intermediates useful in the manufacture of therapeutic agents that comprises reacting a $\Delta^{1,2}$-2($\alpha$-toluyl)cyclohexenyl-acetonitrile, with hydrogen in the presence of a hydrogenation catalyst, and recovering a 1-benzyl-1,2,3,4,5,6,7,8-octahydroisoquinoline from the reaction mixture.

2. The process defined in claim 1 wherein the reaction is performed at a temperature within the range of about 80° to 100° C., using hydrogen at a pressure of about 60 atmospheres.

3. The process defined in claim 2 wherein the catalyst is Raney nickel and the reaction is performed in a lower alcohol solvent medium.

HANS HENECKA.

References Cited in the file of this patent

Grewe et al., Berichte, vol. 81, pages 279–286 (1948).